United States Patent [19]

Sardisco et al.

[11] 4,328,196
[45] May 4, 1982

[54] PRODUCTION OF ALKALI METAL PRODUCTS FROM ALKALI METAL FLUOSILICATE

[75] Inventors: John B. Sardisco, Shreveport, La.; Erhart K. Drechsel, Montgomery, Tex.

[73] Assignee: Pennzoil Company, Houston, Tex.

[21] Appl. No.: 190,850

[22] Filed: Sep. 25, 1980

[51] Int. Cl.$^3$ .................. C01B 25/30; C01D 5/02; C01D 9/04

[52] U.S. Cl. .................. 423/309; 423/395; 423/551; 423/641

[58] Field of Search .............. 423/490, 551, 395, 309, 423/641

[56] References Cited

U.S. PATENT DOCUMENTS

| | | | |
|---|---|---|---|
| 1,150,900 | 8/1915 | Strickler | 423/309 |
| 1,922,283 | 8/1933 | Dering | 23/304 |
| 2,853,363 | 0/1958 | Sidun et al. | 423/483 |
| 2,914,474 | 11/1959 | Hillyer et al. | 423/490 |
| 3,689,216 | 0/1972 | Brown | 423/483 |
| 3,764,655 | 10/1973 | Ehlers et al. | 423/309 |
| 4,028,237 | 0/1977 | Nishimura et al. | 423/305 |
| 4,137,063 | 0/1979 | Sardisco | 423/305 |
| 4,171,342 | 10/1979 | Hirko et al. | 423/490 |
| 4,264,563 | 4/1981 | Sikdar | 423/321 R |

OTHER PUBLICATIONS

Kirk—Othmer, *Encyclopedia of Chemical Technology*, Second Edition (1968), vol. 15, pp. 236-239, Interscience Publishers, Inc.

Jacobson, *Encyclopedia of Chemical Reactions*, Reinhold Publishing Corporation (1956), pp. 320, 321, 583.
Chemical Abstracts, vol. 68, 1968, p. 61084f.

*Primary Examiner*—O. R. Vertiz
*Assistant Examiner*—Wayne A. Langel
*Attorney, Agent, or Firm*—Lowe, King, Price & Becker

[57] ABSTRACT

Alkali metal-containing salt products selected from the group consisting of alkali metal dihydrogen phosphate, alkali metal sulfate, alkali metal nitrate, and mixtures thereof, together with alkaline earth metal fluoride, are produced from alkali metal fluosilicate by the steps of:

(a) reacting alkali metal fluosilicate with alkaline earth metal ion in an aqueous solution to form alkali metal hydroxide and solid alkaline earth metal fluoride with $SiO_2$;

(b) separating the solid alkaline earth metal fluoride and $SiO_2$ and recovering as useful products;

(c) reacting the remaining alkali metal hydroxide solution with a mineral acid selected from the group consisting of phosphoric acid, sulfuric acid, nitric acid, and mixtures thereof, at a temperature in the range of about 30°–100° C. until the reaction is complete; and (d) recovering the alkali metal-containing product.

Also provided by this invention is a continuous system for conducting this reaction whereby mother liquors may be recycled and the acid reused in the process, and wherein mineral acid is recovered from which anhydrous HCl can be produced.

12 Claims, 1 Drawing Figure

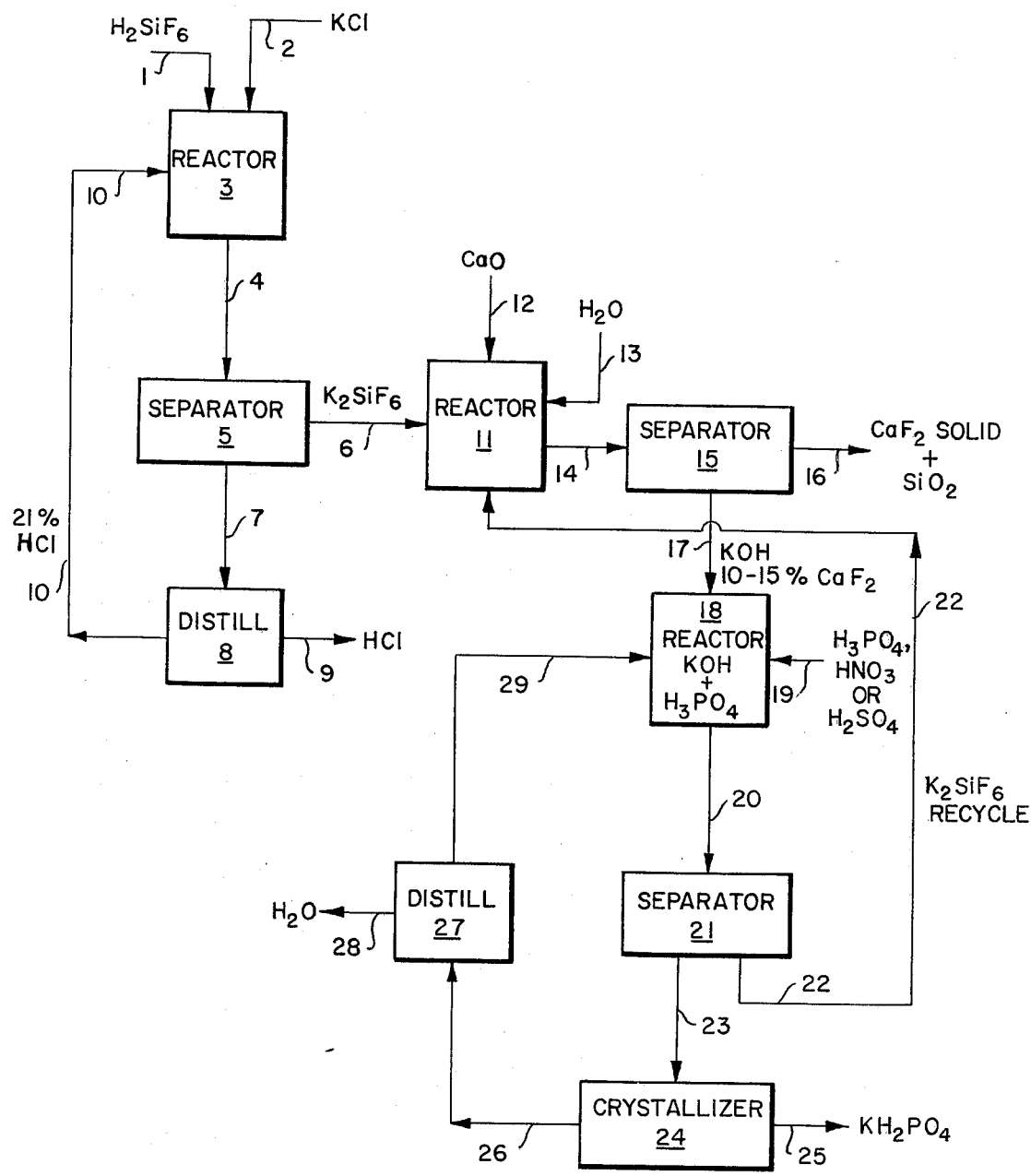

PRODUCTION OF ALKALI METAL PRODUCTS FROM ALKALI METAL FLUOSILICATE

TECHNICAL FIELD

This invention relates to a process for the production of valuable alkali metal-containing materials from alkali metal fluosilicate, and more particularly to a process for the production of potassium-containing products and alkaline earth metal fluorides from potassium fluosilicate.

BACKGROUND ART

There is substantial prior art concerned with the production of alkali metal fluosilicates such as potassium fluosilicate or sodium fluosilicate. Potassium fluosilicate is most commonly produced during acidulation of phosphate rock with a mineral acid. Phosphate rock normally contains about 3–4% of fluorine and heretofore the fluorine was usually evolved as a gaseous fluoride during the acidulation reaction and the fluorides were then trapped or generated into the atmosphere.

Because of the present stringent air and water pollution regulations, various proposals have been made for preventing fluorine emission in such phosphoric acid plants. One of the proposals involves the addition of potassium ion to the acidulation reaction so that potassium fluosilicate is produced during acidulation and, being a solid, can be separated from the resulting reaction mixture. See, for example, U.S. Pat. No. 3,840,639 to E. K. Dreschsel. Recently issued literature in the patent art discloses methods whereby the phosphate rock is reacted with phosphoric acid or sulfuric acid in the presence of controlled amounts of potassium ion and controlled amounts of silicon dioxide so that evolution of the fluorides is suppressed and the potassium fluosilicate precipitates. Thus, in issued U.S. Pat. Nos. 4,086,322 and 4,160,657 processes are described wherein phosphate rock is acidulated with phosphoric acid in the presence of potassium ion and silicon dioxide wherein the fluorides are precipitated as potassium fluosilicate and can be removed from the system. Similar systems are described, for example, in U.S. Pat. No. 4,060,685 where the potassium fluosilicate is separated with the gypsum.

The present invention provides a method whereby alkali metal fluosilicate from any source can be reacted to produce valuable potassium-containing compounds, as well as calcium fluoride, which is available commerically under the trade name FLUORSPAR.

DISCLOSURE OF INVENTION

It is, accordingly, one object of the present invention to provide a method for the production of valuable alkali metal-containing salts.

A further object of the invention is to provide a method for the production of useful potassium-containing salts from potassium fluosilicate obtained from any source.

A still further object of the invention is to provide a method for the production of alkali metal contaning salts and alkali earth metal fluorides from alkali metal fluosilicates through reaction with alkaline earth metal ions to form alkali metal hydroxide, and then reaction of this intermediate with a mineral acid to produce the alkali metal-containing salt.

Other objects and advantages of the present invention will become apparent as the description thereof proceeds.

In satisfaction of the foregoing objects and advantages of the present invention there is provided a method for the production of an alkali metal-containing salt product selected from the group consisting of alkali metal dihydrogen phosphate, alkali metal sulfate, alkali metal nitrate, and mixtures thereof, together with alkaline earth metal fluoride, from alkali metal fluosilicate by the steps which comprise:

(a) reacting alkali metal fluosilicate with alkaline earth metal ion in an aqueous solution to form alkali metal hydroxide and solid alkaline earth metal fluoride with $SiO_2$, (b) separating the solid alkaline earth metal fluoride and $SiO_2$ and recovering as useful products;

(c) reacting the remaining alkali metal hydroxide solution with a mineral acid selected from the group consisting of phosphoric acid, sulfuric acid, nitric acid, and mixtures thereof, at a temperature in the range of about 30°–100° C. until the reaction is complete; and (d) recovering the alkali metal-containing product.

Also provided by this invention is a continuous system for conducting this reaction whereby mother liquors may be recycled and the acid reused in the process, and wherein mineral acid is recovered from which anhydrous HCl can be produced.

BRIEF DESCRIPTION OF DRAWING

Refererence is now made to the drawing accompanying the application wherein the FIGURE is a flow sheet describing a preferred embodiment of the invention for the production of potassium dihydrogen phosphate from potassium fluosilicate.

BEST MODE FOR CARRYING OUT THE INVENTION

As pointed out above, the present invention is concerned with a method for the production of alkali metal-containing products or salts from alkali metal fluosilicate through the intermediate hydroxide, followed by reaction with the appropriate mineral acid to supply the anion for production of the desired alkali metal salt.

In the process of the invention, any alkali metal fluosilicate such as $K_2SiF_6$, $Na_2SiF_6$, or mixtures may be employed. However, the preferred starting material is potassium fluosilicate to produce $KH_2PO_4$, $K_2SO_4$, or $KNO_3$, and the process is described hereinafter with respect to that embodiment.

In this reaction, the potassium fluosilicate starting material may be obtained from any source but usually will be a product from a phosphoric acid acidulation reaction with phosphate rock. As pointed out above, the potassium fluosilicate is produced during acidulation of phosphate rock by a mineral acid wherein potassium ion, and usually silica, are present during the reaction. The potassium fluosilicate may precipitate with gypsum in a sulfuric acid system and can thereafter be separated from the gypsum in accordance with the teachings of U.S. Pat. No. 4,060,586. Alternatively, the potassium fluosilicate formed in acidulation of phosphate rock with phosphoric acid and potassium ion may be separated as a substantially pure product prior to gypsum formation as described in U.S. Pat. Nos. 4,160,657 and 4,086,322.

It is also within the scope of the present invention to form the potassium fluosilicate from fluosilicic acid, $H_2SiF_6$, by reaction with potassium chloride. This reaction requires two moles of potassium chloride per mole of fluosilicic acid in hydrochloric acid solution to produce the potassium fluosilicate with evolution of hydrogen chloride. The potassium fluosilicate may be formed in situ by the reaction of silicon tetrafluoride and hydrofluoric acid, which are gases normally evolved from the sulfuric acid wet process phosphoric acid systems. Therefore, this reaction for formation of the potassium fluosilicate may be incorporated as an initial step in the process of the present invention. These reactions are described in U.S. Pat. No. 4,137,063, the disclosure of which is incorporated herein by reference.

In the method of the present invention the potassium fluosilicate is converted to a useful potassium salt such as potassium dihydrogen phosphate, potassium sulfate, or potassium nitrate. Use of mixtures of mineral acids will result in the production of mixtures of these salts. Accordingly, selection of the appropriate mineral acid requires a previous determination of the salt desired to be produced.

In the present invention, the initial step involves the reaction of the potassium fluosilicate with alkaline earth metal ion (Ca, Sr, Mg, Ba, etc.), but preferably, calcium ion, stoichiometrically in aqueous solution to produce potassium hydroxide and alkaline earth metal fluoride, together with silica. Sufficient alkaline earth metal ion is present in the aqueous solution to theoretically react with all the fluoride present, and preferably a slight excess of alkaline earth metal ion, is maintained in the system to insure that all of the fluorine contained in the potassium fluosilicate is converted to alkaline earth metal fluoride. During this reaction the potassium fluosilicate is converted to potassium hydroxide which remains in aqueous solution. The alkaline earth metal fluoride formed during the reaction is solid and precipitates from the system together with silica so that it can be recovered by normal separation procedures such as filtration, centrifugation, thickening or the like in aqueous solution.

Any suitable alkaline earth metal compound may be employed in this step of the process if it is operable. However, the compound employed in this step of the reaction is preferably calcium oxide but may also include calcium-containing materials such as calcium carbonate, cement dust or monocalcium phosphate, or substantially any alkaline calcium compound which is effective to react with the fluorine in the reaction. A calcium compound is preferably used because the desired product is $CaF_2$ or Fluorspar. Mixtures may also be employed. The invention is described hereinafter with respect to the use of calcium oxide as the alkaline earth metal reactant.

In the reaction of the potassium fluosilicate with calcium oxide or other alkaline earth metal reactant, the reactor should be maintained at a temperature in the range of about 75–100 degrees C. in the aqueous medium. A temperature of about 90 degrees C. is preferred. Atmospheric pressure is normally preferred, but superatmospheric or subatmospheric pressure may be used if desired.

In this first step of the reaction, when the potassium fluosilicate is reacted with calcium oxide as the calcium reactant, the reaction proceeds primarily according to the following equation:

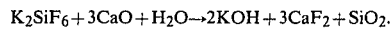

$$K_2SiF_6 + 3CaO + H_2O \rightarrow 2KOH + 3CaF_2 + SiO_2.$$

In this reaction some $SiO_2$ is solubilized and is probably in the form of soluble potassium metasilicate ($K_2SiO_3$). Further, as may be seen from this reaction, three moles of calcium fluoride can be produced from the fluorine contained in one mole of potassium fluosilicate. Thus, this reaction represents a valuable system for the production and recovery of calcium fluoride which is of substantial value commercially. The calcium fluoride and silicon dioxide solids are separated by standard separation techniques. The calcium fluoride and silicon dioxide are solids and may form a double salt of the formula $CaF_2 \cdot SiO_2$, from which the $CaF_2$ can be recovered.

The potassium hydroxide solution recovered from the initial step of the reaction is then converted to the desired potassium salt by reaction with the appropriate mineral acid. Mineral acids which may be used include phosphoric acid, sulfuric acid, nitric acid, and the like, as well as mixtures of these acids from which mixtures of salts will be produced. As may be understood, the reaction sequence of this second stage operates as follows when phosphoric acid is the reactant:

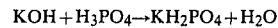

$$KOH + H_3PO_4 \rightarrow KH_2PO_4 + H_2O$$

Any soluble $SiO_2$ and fluorine in solution at this stage precipitates as $K_2SiF_6$ which can be recycled to the hydrolysis step. It will be understood therefore, that reaction of the potassium hydroxide with phosphoric acid results in the production of potassium dihydrogen phosphate, a valuable fertilizer material; reaction with sulfuric acid results in the production of potassium sulfate; and reaction with nitric acid results in the production of potassium nitrate, all of which are useful industrial products.

The reaction of the mineral acid with the potassium hydroxide is generally carried out under atmospheric conditions in well agitated reactors at a temperature in the range of about 30–100 degrees C., preferably about 40–75 degrees C. The aqueous solution of the potassium salt may be treated by evaporation or extraction to recover the pure potassium salt therefrom.

The drawing accompanying this application describes a specific embodiment of the present invention for the production of potassium dihydrogen phosphate from potassium fluosilicate. The drawing also incorporates the initial production of the potassium fluosilicate from waste fluosilicic acid or mixture of silicon tetrafluoride and hydrogen fluoride.

Referring specifically now to the drawing, it will be seen that a complete system is described by which potassium dihydrogen phosphate, one of the valuable products of this invention, can be produced from the starting hydrofluosilicic acid. As shown in the flow sheet, the fluosilicic acid from line 1 and potassium chloride from line 2 are reacted stoichiometrically in reactor 3 in accordance with the teachings of U.S. Pat. No. 4,137,063. The reaction is conducted in the presence of about a 21% solution of recycle hydrochloric acid from line 10. The resulting reaction mixture is then transferred by line 4 to separator 5 where potassium fluosilicate is removed by line 6 and passed to reactor 11. In the meantime, the aqueous solution from separator 5 is passed by line 7 to distillation column 8 where the solution is distilled to produce a concentrated solution of HCl from line 9 from which aqueous hydrogen chloride can be recovered. Since the azeotrope from this distillation produces 21% HCl, as taught in U.S Pat. No. 4,137,063, this 21% hydrochloric acid solution is recycled by line 10 to reactor 3 for reuse in the process.

In potassium fluosilicate reactor 11, calcium oxide is added by line 12 together with sufficient water from line 13 to provide an aqueous slurry or solution. In reactor 11, the potassium fluosilicate reacts with the calcium oxide to produce a slurry of potassium hydroxide, calcium fluoride, and $SiO_2$ in an aqueous system. This mixture is removed by line 14 to filter or separator 15, where the calcium fluoride-$SiO_2$ solid is recovered by line 16. The $CaF_2$ may then be recovered. The resulting aqueous solution or filtrate containing KOH and usually about 10-15 weight percent of $CaF_2$, is removed by line 17 to reactor 18 and phosphoric acid or other acid is added by line 19 for reaction with the potassium hydroxide. This reactor is maintained at a temperature of 60 degrees C. with recycle of mother liquors from line 29. The resulting reaction mixture is removed by line 20 to separator 21 where unreacted $K_2SiF_6$ is removed by line 22 and recycled to reactor 11. The remaining solution is passed by line 23 to crystallizer 24 where the potassium dihydrogen phosphate is precipitated by removal of the water by evaporation or distillation. The solid potassium dihydrogen phosphate is then removed and recovered at line 25. The mother liquors are removed by line 26 to distillation column 27 where excess water is removed by line 28. The concentrated mother liquors are then recycled by line 29 to reactor 18 for reuse in the process.

The following examples are presented to illustrate the invention, but it is not to be considered as limited thereto. In the following examples, parts are by weight unless otherwise indicated.

EXAMPLE 1: Preparation of $KH_2PO_4$

In this experiment one mole of potassium fluosilicate is reacted with three moles of calcium oxide in a reactor at a temperature of 90 degrees C. in the presence of sufficient water to maintain a slurry which can be easily handled. The reactor is provided with agitation and on completion of the reaction, the solid precipitate is removed by filtration to provide a mixture of calcium fluoride and $SiO_2$. The remaining solution or filtrate is then transferred to a reactor maintained at a temperature of 60 degrees C. and two moles of phosphoric acid per mole of the theoretical amount of potassium hydroxide contained in the reaction are added to the reactor. After the reaction is complete, there is recovered a solution of potassium dihydrogen phosphate.

EXAMPLE 2: Preparation of $K_2SO_4$

The reaction of Example 1 is repeated except that the acid added in the second step is sulfuric acid. The product recovered on evaporation is potassium sulfate.

EXAMPLE 3: Preparation of $KNO_3$

The reaction of Example 1 is repeated except that the acid used in the second step is nitric acid. The product recovered on vacuum evaporation is potassium nitrate.

EXAMPLE 4: Reaction of $K_2SiF_6$ With CaO

In this experiment one mole of potassium fluosilicate is reacted with 2.8 moles of calcium oxide in a reactor at a temperature of 80 degrees C. in the presence of sufficient water to maintain a slurry which can be easily handled. The reactor is provided with agitation and on completion of the reaction, the solid precipitate is removed by filtration, reslurried with water to remove solubile components and refiltered. The resulting filtrate is mostly KOH and residue is mostly calcium fluoride and $SiO_2$.

The results of the experiment are given below:

| Input (Grams) | |
|---|---|
| Calcium oxide | 22 |
| Water | 150 |
| $K_2SiF_6$ | 25 |
| Reslurry Water | 150 |

| | Output (Grams) | | | |
|---|---|---|---|---|
| | Weight | Ions | | |
| | | $K_2O$ | Ca | F | $SiO_2$ |
| Filtrate | 110 | 7.9 | 0.004 | 1.8 | 0.76 |
| Reslurry Filtrate | 167 | 3.1 | 0.02 | 0.8 | 0.35 |
| Dry Residue | 35 | 1.6 | 13.3 | 9.4 | 4.8 |
| $K_2O$ Recovery | | 88% (Based on Output) | | | |
| $SiO_2$ in Residue | | 81% (Based on Output) | | | |

EXAMPLE 5: Reaction of $K_2SiF_6$ With Monocalcium Phosphate

The reaction of Example 4 is repeated except that the potassium fluosilicate is reacted with monocalcium phosphate instead of calcium oxide.

| Results | |
|---|---|
| Input (Grams) | |
| Monocalcium phosphate | 99 |
| Water | 278 |
| $K_2SiF_6$ | 25 |
| Reslurry Water | 200 |

| | Output (Grams) | | | | | |
|---|---|---|---|---|---|---|
| | Total Weight | Ions | | | | |
| | | $K_2O$ | Ca | F | $SiO_2$ | $P_2O_5$ |
| Filtrate | 297 | 8.4 | 2.1 | 0.06 | | 41.0 |
| Reslurry Filtrate | 212 | 2.3 | 0.25 | 0.04 | | 8.3 |
| Dry Residue | 42 | 1.1 | 14.5 | 11.1 | 5.2 | 6.7 |
| $K_2O$ Recovery | | 91% (Based on Output) | | | | |
| $SiO_2$ in Residue | | 76% (Based on Feed) | | | | |

EXAMPLE 6: Reaction of $K_2SiF_6$ With Cement Dust

The reaction of Example 4 is repeated except that the potassium fluosilicate is reacted with cement dust instead of calcium oxide, and the temperature is 95 degrees C. instead of 80 degrees C.

| Results | |
|---|---|
| Composition of Cement Dust (Wt. %) | |
| Ca | 25.32 |
| $K_2O$ | 14.08 |
| $SO_4$ | 20.36 |
| $Na_2O$ | 1.86 |
| F | 0.14 |
| $SiO_2$ | 8.86 |

| Input (Grams) | |
|---|---|
| Cement Dust | 125 |
| Water | 220 |
| $K_2SiF_6$ | 55 |
| Reslurry Water | 215 |

| | Output (Grams) | | | | | |
|---|---|---|---|---|---|---|
| | Total Weight | Ions | | | | |
| | | $K_2O$ | Ca | F | $SiO_2$ | $SO_4$ |

Results (continued)

| | | | | | |
|---|---|---|---|---|---|
| Filtrate | 193 | 24.3 | — | 2.9 | 0.14 | 12.2 |
| Reslurry Filtrate | 213 | 15.0 | — | 1.2 | 0.08 | 9.8 |
| Dry Residue | 106 | 6.2 | 33.0 | 22.4 | 22.0 | 5.2 |
| $K_2O$ Recovery | 86.4% (Based on Output) | | | | | |
| $SiO_2$ in Residue | 99% (Based on Output) | | | | | |

EXAMPLE 7: Production of $K_2SO_4$

A. The reaction of Example 6 is repeated except a scale-up factor of six (Based on $K_2SiF_6$) was used for weights of reactants.

Results

| Input (Grams) | |
|---|---|
| Cement Dust | 750 |
| Water | 1,254 |
| $K_2SiF_6$ | 330 |
| Reslurry Water | 1,000 |

| | Output (Grams) | | | | | |
|---|---|---|---|---|---|---|
| | Total Weight | $K_2O$ | Ca | F | $SiO_2$ | $SO_4$ |
| Filtrate | 836 | 115.4 | — | 15.7 | 0.6 | 55.3 |
| Reslurry Filtrate | 1176 | 104.6 | — | 9.2 | 0.4 | 64.0 |
| Dry Residue | 669 | 59.6 | 208.5 | 147.3 | 157.6 | 47.0 |
| $K_2O$ Recovery | 78.7% (Based on Output) | | | | | |
| $SiO_2$ in Residue | 99.4% (Based on Output) | | | | | |

B. Approximately 200 grams of the filtrate were then heated to 60 degrees C., and sufficient concentrated sulfuric acid was added to form $K_2SO_4$. The mixture was stirred for 10 minutes at 60 degrees C. and filtered using a Buchner funnel.

| Filtrate | 208 |
|---|---|
| 96% Sulfuric Acid | 10 |

| | Output (Grams) | | | | | |
|---|---|---|---|---|---|---|
| | Total Weight | $K_2O$ | Ca | F | $SiO_2$ | $SO_4$ |
| Filtrate | 222.6 | 24.6 | — | 1.1 | Nil | 21.9 |

C. An aliquot of the filtrate from Step B was evaporated, this evaporated product was dried overnight at 110 degrees C., and analyzed:

| | Input (Grams) | | | | |
|---|---|---|---|---|---|
| | Total Dry Wt. | $K_2O$ | F | $SiO_2$ | $SO_4$ |
| Evaporated Product | 35.2 | 17.7 | 1.3 | 0.3 | 18.8 |

| X-Ray Diffraction data of solid from Evaporation Step. | |
|---|---|
| $K_2SO_4$ | 68% |
| $K_3H(SO_4)_2$ | 24% |
| $K_2SiF_6$ | 6% |

EXAMPLE 8: Preparation of Potassium Nitrate

A. The reaction of Example 4 is repeated in two separate runs except that one mole of potassium fluosilicate is reacted with 2.5 moles of calcium oxide.

The results of the experiments are given below:

| Run No. | | |
|---|---|---|
| Input (Grams) | | |
| Calcium oxide | 100 | 300 |
| Water | 500 | 1500 |
| $K_2SiF_6$ | 125 | 375 |
| Reslurry Water | 400 | 1200 |

| | Output (Grams) | | | | |
|---|---|---|---|---|---|
| | Total | Ions | | | |
| (Run A-I) | Weight | $K_2O$ | Ca | F | $SiO_2$ |
| Filtrate | 316 | 28.9 | — | — | — |
| Reslurry Filtrate | 414 | 15.6 | — | — | — |
| Dry Residue | 170 | 12.8 | 63.0 | 45.9 | 22.5 |
| $K_2O$ Recovery | 78% (Based on Output) | | | | |
| $SiO_2$ in Residue | 66% (Based on Feed) | | | | |

| | Output (Grams) | | | | |
|---|---|---|---|---|---|
| | Total | Ions | | | |
| (Run B II) | Weight | $K_2O$ | Ca | F | $SiO_2$ |
| Filtrate | 1162 | 108.0 | — | — | — |
| Reslurry Filtrate | 1182 | 35.8 | — | — | — |
| Dry Residue | 491 | 29.2 | 183.9 | 132.7 | 68.0 |
| $K_2O$ Recovery | 83% (Based on Output) | | | | |
| $SiO_2$ in Residue | 66% (Based on Feed) | | | | |

The aforementioned filtrates were combined in the approximate ratio of 1 part of Filtrate I to 4 parts of Filtrate II. The mixture was designated Filtrate III.

One hundred grams of Filtrate III was heated to 60 degrees C., and sufficient 70.5% nitric acid was added to form $KNO_3$ and $K_2SiF_6$. The mixture was filtered at 60 degrees C. using a Buchner funnel vacuum system to remove insoluble $K_2SiF_6$ which would be recycled to the hydrolysis step.

| Input (Grams) | |
|---|---|
| Filtrate III | 200 |
| 70.5% $HNO_3$ | 7.4 |

| | Output (Grams) | | | |
|---|---|---|---|---|
| | Total | Ions | | |
| | Weight | $K_2O$ | F | $SiO_2$ | N |
| Filtrate | 107 | 8.5 | 1.3 | — | 1.0 |
| Dry Residue | 4 | 1.4 | 1.5 | — | 0.02 |
| $K_2O$ Recovery | 86% (Based on Output) | | | | |
| N Recovery | 98% (Based on Output) | | | | |

C. An aliquot of the filtrate from Step B was evaporated and the residue was dried overnight at 110 degrees C.

| Input (Grams) | |
|---|---|
| Aliquot | 89.2 |

| | Output (Grams) | | | |
|---|---|---|---|---|
| | Total | Ions | | |
| | Dry Wt. | $K_2O$ | F | $SiO_2$ | N |
| Evaporated Product | 10.5 | 5.1 | 0.9 | 0.3 | 0.9 |

| X-Ray Diffraction data of product from evaporation step. | |
|---|---|
| $KNO_3$ | 90% |
| Other | 7% |

EXAMPLE 9: Preparation of Potassium Phosphate

A. In this experiment, one mole of potassium fluosilicate is reacted with 2.8 moles of calcium oxide in a reactor at a temperature of 80 degrees C. in the presence of sufficient water to maintain a slurry which can be easily handled. The reactor is provided with agitation and on completion of the reaction, the solid residue is removed by filtration, slurried with water to remove soluble components, and refiltered. The resulting filtrate is mostly KOH, and the residue is mostly calcium fluoride and $SiO_2$.

| Results | | | | |
|---|---|---|---|---|
| Input (Grams) | | | | |
| Calcium oxide | | 400 | | |
| Water | | 2569 | | |
| Potassium fluosilicate | | 500 | | |
| Reslurry Water | | 1569 | | |
| Output (Grams) | | | | |
| | Total | Ions | | |
| | Weight | $K_2O$ | Ca | F | $SiO_2$ |
| Filtrate | 1489 | 108.4 | — | 36.8 | 14.1 |
| Reslurry Filtrate | 1694 | 62.0 | — | 14.4 | 6.2 |
| Dry Residue | 707 | 44.2 | 278.4 | 199.0 | 95.3 |
| $K_2O$ Recovery | | 79% (Based on Output) | | | |
| $SiO_2$ in Residue | | 82% (Based on Output) | | | |

B. One hundred grams of the filtrate was heated to 60 degrees C., sufficient 34% $P_2O_5$ acid was added to form $KH_2PO_4$ and $K_2SiF_6$. The mixture was stirred for 10 minutes at 60 degrees C. and filtered at 60 degrees C. in an oven using a Buchner funnel and vacuum system to remove insoluble $K_2SiF_6$ which could be recycled to the hydrolysis step.

| Input (Grams) | | | | |
|---|---|---|---|---|
| Strong Filtrate | | 100 | | |
| Acid (34% $P_2O_5$) | | 16.7 | | |
| Output (Grams) | | | | |
| | Total | Ions | | |
| | Weight | $K_2O$ | F | $P_2O_5$ | $SiO_2$ |
| Filtrate | 118 | 5.8 | 0.7 | 5.3 | 0.05 |
| Dry Residue | 5 | 2.1 | 2.5 | 0.01 | 1.0 |
| $K_2O$ Recovery | | 73% (Based on Output) | | | |
| $P_2O_5$ Recovery | | 100% (Based on Output) | | | |
| $SiO_2$ in Residue | | 95% (Based on Output) | | | |

C. The water in an aliquot of the filtrate from Step A was evaporated and the product was dried overnight at 100 degrees C.

| Input (Grams) | | | | |
|---|---|---|---|---|
| Aliquot of Filtrate | | 94.7 | | |
| Output (Grams) | | | | |
| | Total | Ions | | |
| | Dry Wt | $K_2O$ | F | $P_2O_5$ | $SiO_2$ |
| Evaporated Product | 9.7 | 4.1 | 0.3 | 4.5 | — |

EXAMPLE 10: Preparation of $K_2SO_4$

A. One hundred grams of Strong Filtrate (from Example 9, Step B) was heated to 60 degrees C. and sufficient concentrated sulfuric acid was added to form $K_2SO_4$ and $K_2SiF_6$. The mixture was stirred for 10 minutes at 60 degrees C. and filtered at 60 degrees C. in an oven using a Buchner funnel and vacuum system to remove insoluble $K_2SiF_6$ that would be recycled to the hydrolysis step.

| Input (Grams) | | | | |
|---|---|---|---|---|
| Strong Filtrate | | 100 | | |
| 96% $H_2SO_4$ | | 8.4 | | |
| Output (Grams) | | | | |
| | Total | Ions | | | |
| | Weight | $K_2O$ | F | $SO_4$ | $SiO_2$ |
| Filtrate | 106.2 | 6.0 | 0.6 | 7.7 | 0.004 |
| Dried Residue | 3.7 | 1.3 | 1.5 | 0 | 0.5 |
| $K_2O$ Recovery | | 82% (Based on Output) | | | |
| $SO_4$ Recovery | | 100% (Based on Output) | | | |
| $SiO_2$ in Residue | | 100% (Based on Output) | | | |

B. The water in an aliquot of the filtrate from Step A was evaporated and the product was dried overnight at 110 degrees C.

| Input (Grams) | | | | |
|---|---|---|---|---|
| Aliquot of Filtrate | | 83.2 | | |
| Output (Grams) | | | | |
| | Total | Ions | | | |
| | Weight | $K_2O$ | F | $SO_4$ | $SiO_2$ |
| Evaporated Product | 10.2 | 4.7 | 0.2 | 6.0 | 0.1 |
| X-Ray diffraction data of product from evaporation step. | | | | | |
| $K_2SO_4$ | | 31% | | | |
| $K_3H(SO_4)_2$ | | 50% | | | |

EXAMPLE 11: Preparation of Potassium Phosphate

A. Two hundred grams of the Strong Filtrate from Example 9, Step B, was heated to 60 degrees C. and sufficient 55% $P_2O_5$ was added to form $KH_2PO_4$ and $K_2SiF_6$. The mixture was stirred for 10 minutes at 60 degrees C. and filtered at 60 degrees C. in an oven using a Buchner funnel and vacuum system to remove insoluble $K_2SiF_6$ which could be recycled to the hydrolysis step.

| Results | | | | |
|---|---|---|---|---|
| Input (Grams) | | | | |
| Strong Filtrate | | 200 | | |
| Acid (55% $P_2O_5$) | | 23.7 | | |
| Output (Grams) | | | | |
| | Total | Ions | | | |
| | Weight | $K_2O$ | F | $P_2O_5$ | $SiO_2$ |
| Filtrate | 214.2 | 9.8 | 0.9 | 11.9 | 0.02 |
| Dried Residue | 9.9 | 3.8 | 4.1 | 0.8 | 1.35 |
| $K_2O$ Recovery | | 72% (Based on Output) | | | |
| $P_2O_5$ Recovery | | 94% (Based on Output) | | | |
| $SiO_2$ in Residue | | 99% (Based on Output) | | | |

B. An aliquot of the filtrate from Step A was evaporated and the product was dried overnight at 110 degrees C.

| Results |
|---|
| Input (Grams) |

-continued

| Results | | | | |
|---|---|---|---|---|
| Aliquot of Filtrate | | 191 | | |
| Output (Grams) | | | | |
| Total Weight | O | F | $P_2O_5$ | $SiO_2$ |
| | | Ions | | |
| Evaporated Product | 24.0 | 9.7 | 0.7 | 10.6 | 0.1 |

| X-ray diffraction of dried evaporated product. | |
|---|---|
| $KH_2PO_4$ | 95% |

EXAMPLE 12: Preparation of Potassium Sulfate

A. Two hundred grams of the Strong Filtrate from Example 9, Step B, was heated to 60 degrees C. and sufficient 96% sulfuric acid was added to form $K_2SO_4$ and $K_2SiF_6$. The mixture was stirred for 10 minutes at 60 degrees C. and filtered at 60 degrees C. in an oven using a Buchner funnel and vacuum system to remove the insoluble $K_2SiF_6$ that could be recycled to the hydrolysis step.

| Results | | | | |
|---|---|---|---|---|
| Input (Grams) | | | | |
| Strong Filtrate | | 200 | | |
| 96% $H_2SO_4$ | | 11.4 | | |
| Output (Grams) | | | | |
| Total Weight | $K_2O$ | F | $SO_4$ | $SiO_2$ |
| | | Ions | | |
| Filtrate | 198.4 | 10.4 | 1.3 | 11.2 | 0.01 |
| Dried Residue | 6.9 | 2.8 | 3.3 | 0.1 | 1.35 |
| $K_2O$ Recovery | 79% (Based on Output) | | | |
| $SO_4$ Recovery | 99% (Based on Output) | | | |
| $SiO_2$ in Residue | 99% (Based on Output) | | | |

B. The water in an aliquot of the filtrate from Step A was evaporated and the product was dried overnight at 110 degrees C.

| Results | | | | |
|---|---|---|---|---|
| Input (Grams) | | | | |
| Aliquot of Filtrate | | 176 | | |
| Output (Grams) | | | | |
| Total Weight | $K_2O$ | F | $SO_4$ | $SiO_2$ |
| | | Ions | | |
| Evaporated Product | 18.7 | 10.3 | 0.7 | 9.3 | 0.9 |

| X-ray diffraction of dried evaporated product. | |
|---|---|
| $K_2SO_4$ | 89% |
| Other | 11% |

EXAMPLE 13: Preparation of $KNO_3$

A. Two hundred grams of the Strong Filtrate from Example 9, Step B, was heated to 60 degrees C. and sufficient 70.5% nitric acid was added to form $KNO_3$ and $K_2SiF_6$. The mixture was stirred for 10 minutes at 60 degrees C. and filtered in an oven at 60 degrees C. using a Buchner funnel vacuum system to remove insoluble $K_2SiF_6$ which could be recycled to the hydrolysis step.

| Results | | | | |
|---|---|---|---|---|
| Input (Grams) | | | | |
| Strong Filtrate | | 200 | | |
| 70.5% Nitric Acid | | 14.0 | | |
| Output (Grams) | | | | |
| Total Weight | $K_2O$ | F | $SiO_2$ | N |
| | | Ions | | |
| Filtrate | 194 | 13.1 | 2.9 | 0.06 | 2.0 |
| Dry Residue | 5.4 | 2.1 | 1.9 | 1.3 | 0.1 |
| $K_2O$ Recovery | 86% (Based on Output) | | | |
| N Recovery | 96% (Based on Output) | | | |
| $SiO_2$ in Residue | 96% (Based on Output) | | | |

B. The water in an aliquot of the filtrate from Step A was evaporated, the product was dried overnight at 110 degrees C.

| Results | | | | |
|---|---|---|---|---|
| Input (Grams) | | | | |
| Aliquot of Filtrate | | 171 | | |
| Output (Grams) | | | | |
| Total Dry Wt | $K_2O$ | F | $SiO_2$ | N |
| | | Ions | | |
| Evaporated Product | 19.4 | 11.1 | 2.2 | 0.8 | 1.7 |

The invention has been described herein with reference to certain preferred embodiments. However, as obvious variations thereon will become apparent to those skilled in the art, the invention is not to be considered as limited there.

We claim:

1. A process for the production of an alkali metal containing product selected from the group consisting of alkali metal dihydrogen phosphate, alkali metal sulfate, alkali metal nitrate, and mixtures thereof, together with alkaline earth metal fluoride, from alkali metal fluosilicate, which process comprises the steps of:
   (a) reacting an alkali metal fluosilicate with a sufficient amount of an alkaline earth metal compound in an aqueous medium to convert the fluorine contained in the alkali metal fluosilicate to an alkaline earth metal fluoride and form an alkali metal hydroxide;
   (b) separating and recovering a solid which contains alkaline earth metal fluoride from the reaction product of step (a);
   (c) reacting the remaining reaction product, which contains the alkali metal hydroxide, with a mineral acid selected from the group consisting of phosphoric acid, sulfuric acid, nitric acid and mixtures thereof to form an alkali metal salt of the mineral acid;
   (d) recovering a solution containing the alkali metal salt; and
   (e) recovering from the solution, as the alkali metal containing product, the alkali metal salt in solid form.

2. A process according to claim 1, wherein the alkali metal fluosilicate is potassium fluosilicate and potassium dihydrogen phosphate, potassium sulfate, or potassium nitrate is produced.

3. A process according to claim 2, wherein the alkaline earth metal compound is a compound of a member selected from the group consisting of calcium, strontium, magnesium, barium, and mixtures thereof.

4. A process according to claim 3, wherein the alkaline earth metal compound is selected from the group consisting of calcium oxide, calcium carbonate, cement dust, monocalcium phosphate, and mixtures thereof.

5. A process according to claim 2, wherein the temperature for the reaction of the mineral acid with the potassium hydroxide is in the range of 30-100 degress C.

6. A process according to claim 5, wherein the temperature for the reaction of the mineral acid with the potassium hydroxide is in the range of 40-75 degrees C.

7. A process according to claim 2, wherein the temperature in the reaction of potassium fluosilicate with the alkaline earth metal compound is in the range of 75-100 degrees C.

8. A process according to claim 1, wherein the acid employed is sulfuric acid and the alkali metal containing product recovered is potassium sulfate.

9. A process according to claim 1, wherein the acid employed is phosphoric acid and the alkali metal containing product recovered is potassium dihydrogen phosphate.

10. A process according to claim 1, wherein the acid employed is nitric acid and the alkali metal containing product recovered is potassium nitrate.

11. A process according to any of claims 8, 9 or 10, wherein the alkaline earth compound is selected from the group consisting of calcium oxide, calcium carbonate, cement dust, calcium phosphate and mixtures thereof.

12. A process according to claim 1, wherein the alkaline earth metal compound is calcium oxide.

* * * * *